Jan. 5, 1960   R. A. MAHLMEISTER   2,919,519
MACHINE TOOL
Filed Sept. 4, 1956   6 Sheets-Sheet 3

INVENTOR.
Raymond A. Mahlmeister
BY
Edward J. Noe Jr.
atty.

| 211 | | A | B | C | D |
|---|---|---|---|---|---|
| CRUSH | — | — | — | — | — |
| OFF | ↑ | O | O | O | O |
| GRIND | ↗ | O | X | O | X |

INVENTOR.
Raymond A. Mahlmeister
BY
Edward J. Noe Jr.
Atty.

_United States Patent Office_

2,919,519
Patented Jan. 5, 1960

2,919,519

MACHINE TOOL

Raymond A. Mahlmeister, Dayton, Ohio, assignor, by mesne assignments, to The Sheffield Corporation, a corporation of Delaware Application September 4, 1956, Serial No. 607,888

14 Claims. (Cl. 51—165)

This invention relates to machine tools and, more particularly, to machine tools having automatic operating cycles.

It is an object of this invention to provide a machine tool such as a grinding machine for performing precision machining operations rapidly and efficiently, and providing an automatic operating cycle having features for universal application.

It is a further object to provide such a machine comprising a few rugged components cooperating in a simple manner for economical manufacture and reliable operation through a long service life, and providing flexible control for optimum performance under a wide variety of applications and operating conditions.

It is a further object to provide a grinding machine providing a grinding wheel feed movement with automatic sequential feed conditions, each feed condition being independently adjustable as to both speed and extent of feed movement.

It is a further object to provide a grinding machine having an automatic sequential feeding movement, provision being made for rapidly retracting the grinding wheel at any point in the cycle, and then rapidly returning the wheel to its previous position in the cycle for continued feeding movement as desired.

It is a further object to provide a grinding machine having a base, subslide and wheelhead supporting main slide, actuating means being provided for both said slides precisely controlled in a unique manner for an automatic grinding cycle.

It is a further object to provide a grinding machine having an automatic feeding cycle wherein adjustable means are provided for controlling the speed or rate of feeding movement, further calibrated adjustment means being provided to set the point in the feeding movement where feed is automatically switched from one adjusted speed to another and to select and set the extent of movement under each speed condition.

Other objects and advantages of the invention will be apparent from the following description, the appended claims, and the accompanying drawings, in which.

While the invention is disclosed as embodied in a grinding machine for grinding hydraulic components and the like, it will be apparent to those skilled in the art that the invention is capable of embodiment in a variety of different machines and for application to a wide variety of products.

In feeding a forming tool such as a grinding wheel a variety of operating conditions may be encountered in a single operation or cycle, depending on circumstances such as workpiece shape, workpiece material and the production rate desired. For example, in grinding cylindrical lands on an hydraulic valve spool the grinding wheel initially picks up a light load until the land depth is reached and then the full grinding wheel surface engages the work and a heavier grinding operation takes place. The present invention provides a machine feed with automatic sequential feed ranges especially adapted for such conditions. Each feed range is adjustable as to both rate and extent, making the machine more universal in its application and providing optimum conditions in each application for precision operation and highest possible production. More specifically, the illustrated machine provides a grinding wheel feed control with an initial rapid transverse movement into close proximity with the work, a fast feed during the initial grinding and a slow feed during the heavier portion of the grinding operation, all automatically controlled in a sequential manner. The rapid transverse movement provides a means for quickly bringing the wheel adjacent the work, retracting the wheel from the work and rapidly returning the wheel to any point in an interrupted cycle.

In the specific machine disclosed the rapid traverse movement is obtained through actuation of an air-hydraulic cylinder in reverse directions. The fast and slow feed ranges are provided by a cam mechanism moved bodily during traverse. During fast feed the feeding cam is rotated at a comparatively fast speed and at a selected point in the cycle its speed of rotation is automatically reduced to provide the slow feed. The rate of rotation of the cam under each condition can be adjusted and the extent of its rotation also controlled.

Figure 1:
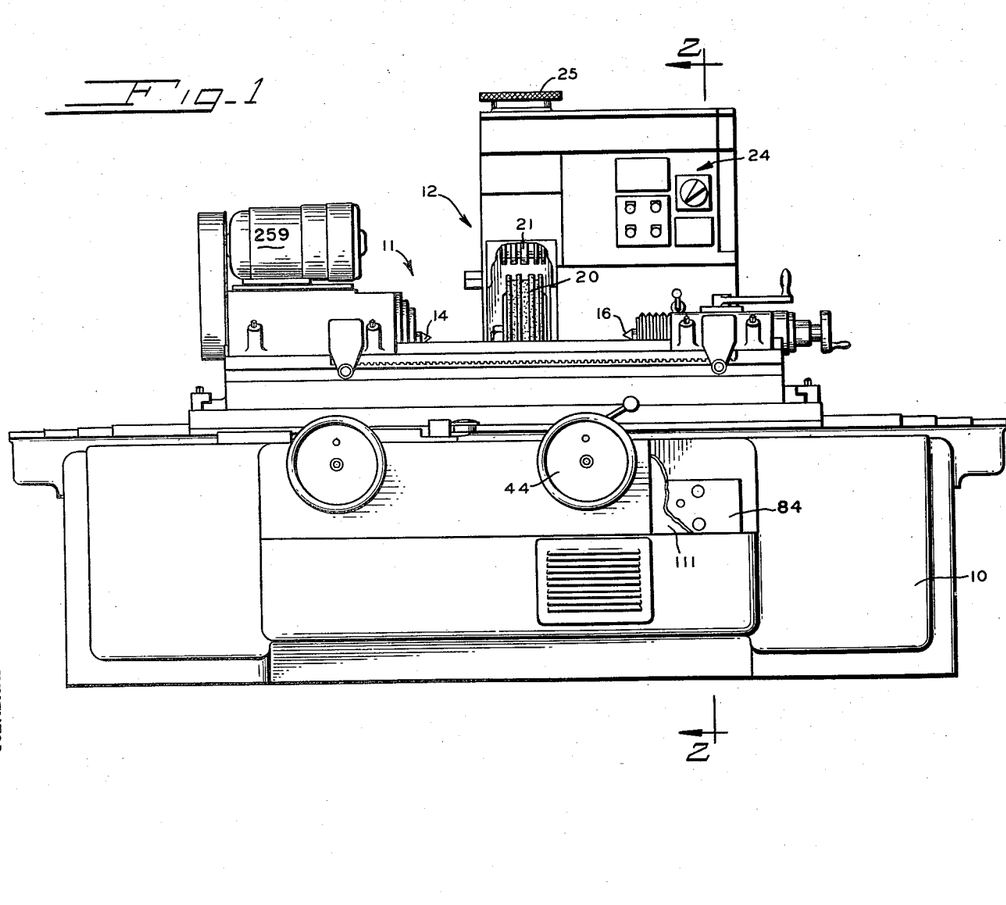
Figure 1 is a front view in elevation of a grinding machine embodying the present invention.

Figure 1 is a front view of an exemplary machine embodying the present invention comprising a base 10 supporting a workhead 11 and a wheelhead 12. The work to be ground is mounted between centers 14 and 16 on workhead 11 and, in this example, is driven by electric motor 259. Grinding wheel 20 is rotatably carried at the lower portion of wheel head 12 and a crusher roller 21 for forming the grinding wheel is mounted directly thereabove. Crusher roll 21 has an automatic dressing cycle controlled by panel 24 and can be manually actuated by handwheel 25.

Figures 2, 3, 4:
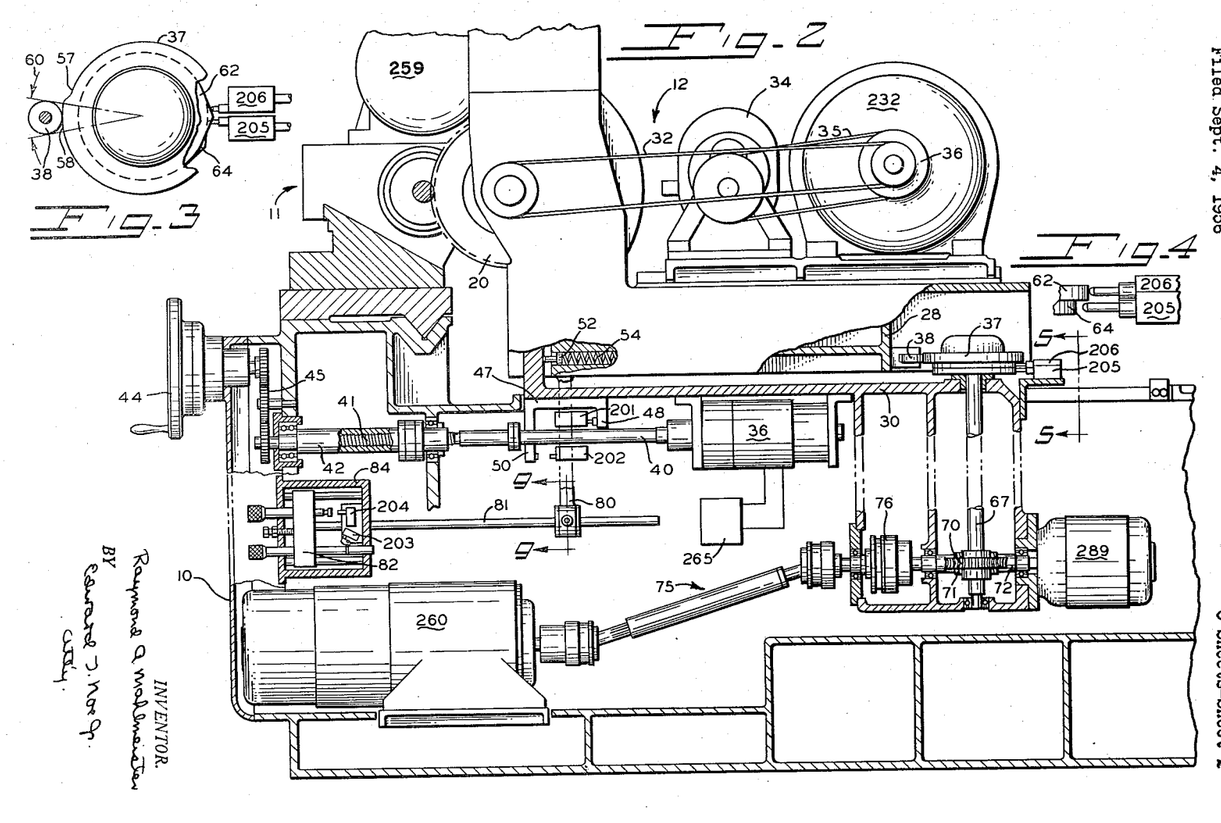
Figure 2 is a sectional view of the machine of Figure 1 taken substantially along line 2—2 of that figure.
Figures 3 and 4 are detailed fragments of a feeding cam and associated switches.
Figure 5:
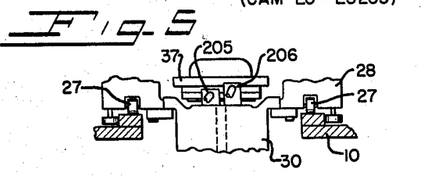
Figure 5 shows the association between the base, subslide, main slide, and wheelhead in a view taken substantially along line 5—5 of Figure 2.

Referring more particularly to Figures 2 and 5, base 10 directly carries, by means of rollers 27, a main wheelhead carrying slide 28. A subslide 30 is carried by main slide 28 for relative movement therebetween. Wheelhead 12 supports fast wheelhead motor 232 driving grinding wheel 20 through belts 32. A slow wheelhead motor 34 rotates grinding wheel 20 at a slow rate during crushing through belts 35, overrunning clutch 36, and belts 32.

An air-hydraulic cylinder 36 of a commercially available type serves to advance and retract subslide 30 and grinding wheel 20 toward and from the work in rapid traverse. Main slide 28 and wheelhead 12 move with subslide 30 during its rapid traverse movements.

A feed cam 37 is carried by subslide 30 and engages a following roller 38 on main slide 28. Upon rotation of cam 37 main slide 28 is moved forwardly relative to subslide 30 for the fast and slow feed movements.

Air-hydraulic cylinder 36 fixed to subslide 30 has a connecting rod 40 threaded at its outer end 41 within rotatable nut 42 fixed against endwise movement. Handwheel 44 rotates nut 42 through a chain of gears 45 to obtain endwise movement of connecting rod 40 to adjustably fixed positions and, through the various supporting structures, to move grinding wheel 20 toward and from the work.

Figures 12, 13:
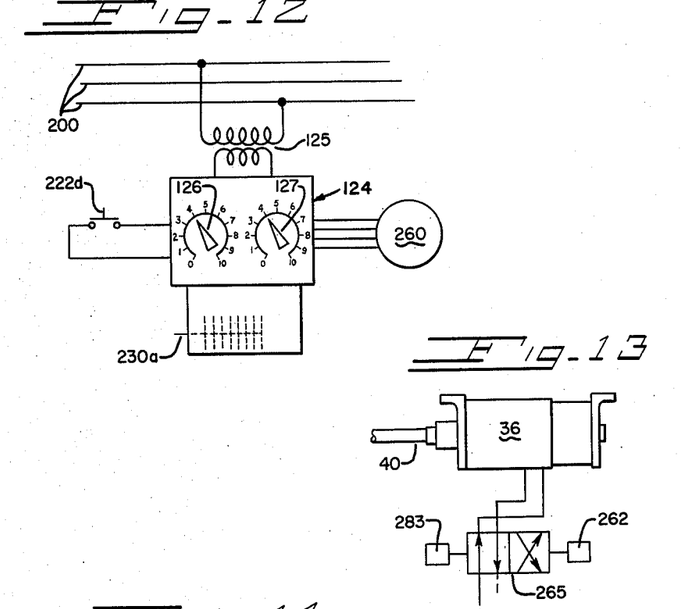
Figure 12 is a diagram of the speed control for the various feed conditions.
Figure 13 is a diagram of the valve control for the traverse cylinder.

Cylinder 36 is controlled by solenoid control valve unit 265 shown diagrammatically in Figure 13. Solenoid 262 actuates valve 265 for forward rapid traverse of the wheelhead and solenoid 283 is energized to obtain return traverse. Subslide 30 carries a switch actuating member 47 which has an extension 48 engaging and actuating switch 201 when the subslide is forward and an extension 50 engaging and actuating switch 202 when the subslide is in its rearward position relative to the base 10. In Figure 2 the subslide is forward and switch 201 is actuated.

The feed cam and associated structure is shown most clearly in Figures 2 to 4. As seen in the central portion of Figure 2, a plunger 52, carried by main slide 28 and engaging a portion of subslide 30, is biased by spring 54 to maintain roller 38 against the periphery of cam 37. As seen in Figure 3, cam 37 has a uniform rise from a Cam-Lo portion 57 to a Cam-Hi portion 58. With cam 37 in its Cam-Hi position main slide 28 is at its forwardmost location relative to subslide 30 and when the cam is in its Cam-Lo position main slide 28 is fully retracted relative to the subslide. A short concentric segment is provided at 60 in the Cam-Hi position. A pair of switch operating cams 62 and 64 rotate with feed cam 37. Cam 62 has a projection which actuates switch 206 when cam 37 reaches its Cam-Hi position relative to roller 38. Cam 64 actuates switch 206 when the feed cam is in its Cam-Lo position relative to the roller. Feed cam 37 has a sufficient rise to accommodate a wide feeding range and only a portion of its periphery from the Cam-Hi position back to a reset point along the cam would be normally used in the basic cycle.

Feed cam 37 is rotated by a vertical shaft 67 having a worm gear 70 adjacent its lower end. Worm gear 70 meshes with a worm 71 on a horizontal shaft 72. An electric feed motor 260 supported in base 10 drives shaft 72 and worm 71 through an extensible splined connection 75 and an electrically controlled clutch 76. After a grinding cycle has taken place and rapid reverse traverse has been accomplished, clutch 76 is automatically disengaged and a reset motor 289 drives shafts 72, 67 and cam 37 in the reverse direction to a reset position. During set-up cam 37 may be jogged to its Cam-Hi position and handwheel 44 manually rotated to move subslide 30 and position grinding wheel 20 to the full desired grinding depth for the particular part size.

Main slide 28 has a downward extension 80 frictionally engaging a carrier rod 81 attached to a carrier 82 within carrier box 84 at the forward face of the machine. Carrier 82 is supported for movement within carrier box 84 by rods 112 and 114. Switches located in box 84 determine the reset position of feed cam 37 and the point in the feed cycle where the transition from fast to slow feed is accomplished. The details of this structure are shown most clearly in Figures 6 to 9. Because rod 81 is connected to main slide 28 it and carrier 82 take part in the full movement of wheelhead 12 under both rapid traverse and the various feed conditions.

Figure 6:
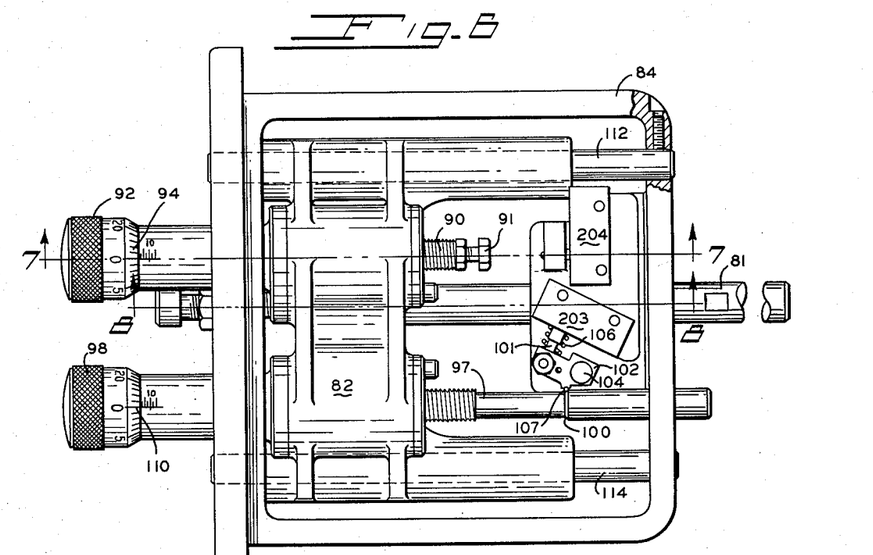
Figure 6 is a side view of the feed or carrier box of the machine.
Figure 7:
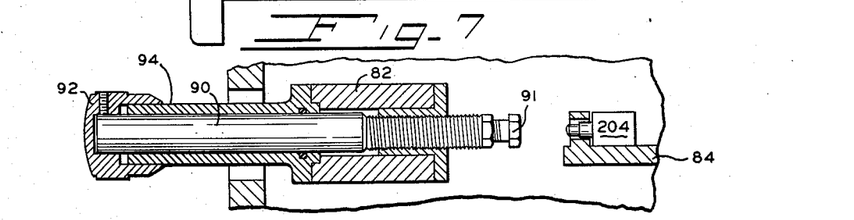
Figure 7 is a sectional fragment taken on line 7—7 of Figure 6.
Figure 8:
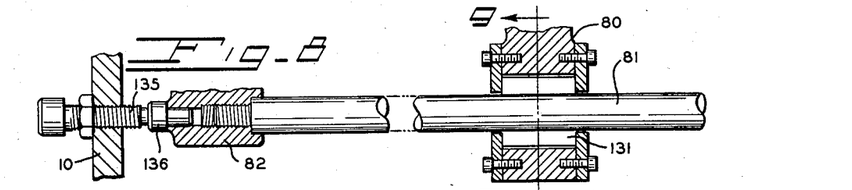
Figure 8 is a sectional view taken on line 8—8 of Figure 6.
Figure 9:
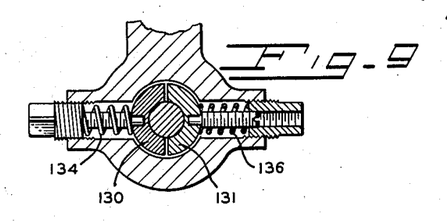
Figure 9 is a sectional view taken on lines 9—9 of Figures 2 and 8, Figures 10 A—C illustrate the electrical circuit involved in the operation of the machine.

Carrier 82 supports a micrometer screw adjustment 90 having a projection 91 at its inner end for engagement with the actuator of switch 204. Switch 204 is actuated at the wheelhead return position when rapid reverse traverse has been accomplished and cam 37 has been reversely rotated to its reset position. Because adjustments of projection 91 determine the full return position and the amount of forward traverse movement is fixed, rotations of micrometer 90 by means of knob 92 set the total feed movement under fast and slow conditions. Calibrations 94 are provided so that in initial set-up the operator can quickly set the total feed desired.

A similar micrometer adjustment 97 rotated by knob 98 sets the endwise position of an annular cam rise surface 100 relative to carrier 82. The inner end of micrometer adjustment 97 is enlarged beyond this cam rise surface. The actuator 101 of limit switch 203 engages one arm of a bellcrank 102 pivoted at 104 and biased by spring 106 to maintain a follower 107 against the inner end of micrometer 97. Thus, as carrier 82 moves outward with wheelhead 12, bellcrank 102 will be rocked in a clockwise direction, as seen in Figure 6, by cam surface 100 and switch 203 will be actuated and held in its actuated condition. Switch 203, through an electric circuit later described, causes the transition from fast to slow feed at a predetermined position determined by the adjustment of knob 98. Calibrations 110 are provided so that the adjusted point of transition can be quickly made. Total feed knob 92 and fast to slow or slow feed knob 98 are accessible at the forward face of the machine by lowering a cover 111 shown in fragment in Figure 1.

Figure 14:
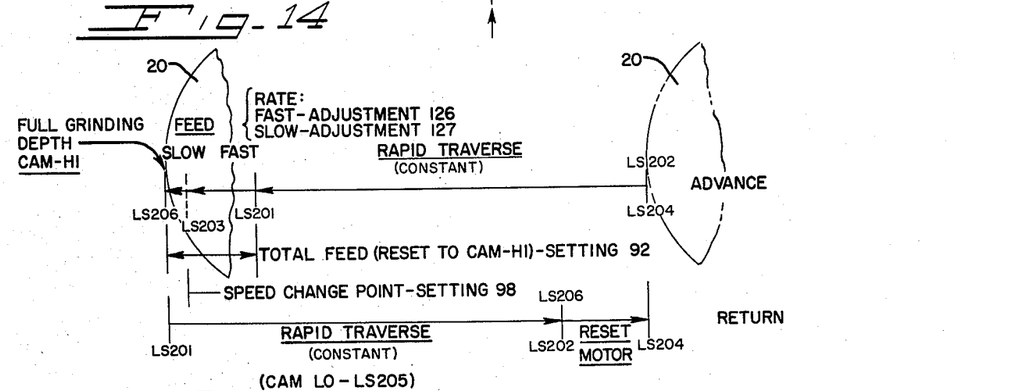
Figure 14 is a diagram indicating the grinding wheel movement, limit switch actuations and speed control.

Figure 14 diagrammatically indicates the switch actuations and feed conditions during both advance and return movement of wheelhead 12 and grinding wheel 20. As seen in the upper portion of this diagram, the advance line indicates that at the return position of wheel 20 limit switches 202 and 204 are actuated. At the end of the rapid traverse movement limit switch 201 is actuated. Switch 203 signals the change in rate of feed and Cam-Hi switch 206 determines the full grinding depth. On return, limit switch 202 is actuated at the end of the rapid traverse movement and the setting of limit switch 204 determines the extent of rotation of cam 37 in the reverse direction to the reset position. Switch 205 limits the reverse rotation of cam 37 at the full Cam-Lo position. Total feed is determined by setting knob 92. The speed change point (in effect the amount of slow feed) is determined by setting knob 98. The fast and slow feed rates are controlled by knobs 126 and 127 respectively (see Figure 12), described below.

Figure 12 illustrates diagrammatically the control system for determining the speed under both fast and slow feed conditions. It comprises a commercially available speed control 124. A suitable control unit for this purpose is, for example, the Thy-mo-trol System produced by General Electric Company, which is a Thyratron type motor speed control.

Transformer 125 connects to control unit 124. Switch contacts 222d, actuated in a manner later described, control energization of unit 124 and feed motor 260. Such control units normally have a single manually adjustable motor speed controlling potentiometer. An additional potentiometer has been added and ganged contacts 230a, controlled by the electric circuit of Figures 10 A—C, place one or the other of the adjustable potentiometers into the circuit of unit 124. Knob 126 adjusts one potentiometer for the fast feed rate and knob 127 controls the slow feed rate. Details of the circuits have been omitted for simplicity.

Friction shoes 130 and 131 are carried at the lower end of extension 80 and urged into engagement with carrier rod 81 by adjustable springs 134 and 136 respectively. An adjustable stop 135, supported in base 10, opposes a button 136 on carrier 82 in line with rod 81. If the full forward movement of wheelhead 12 should go beyond the point of engagement of button 136 with stop 135, friction shoes 130 and 131 will slide along rod 81 and upon return movement of the wheelhead will move the carrier 82 rearward with a new gripping point on rod 81.

Figure 10A:
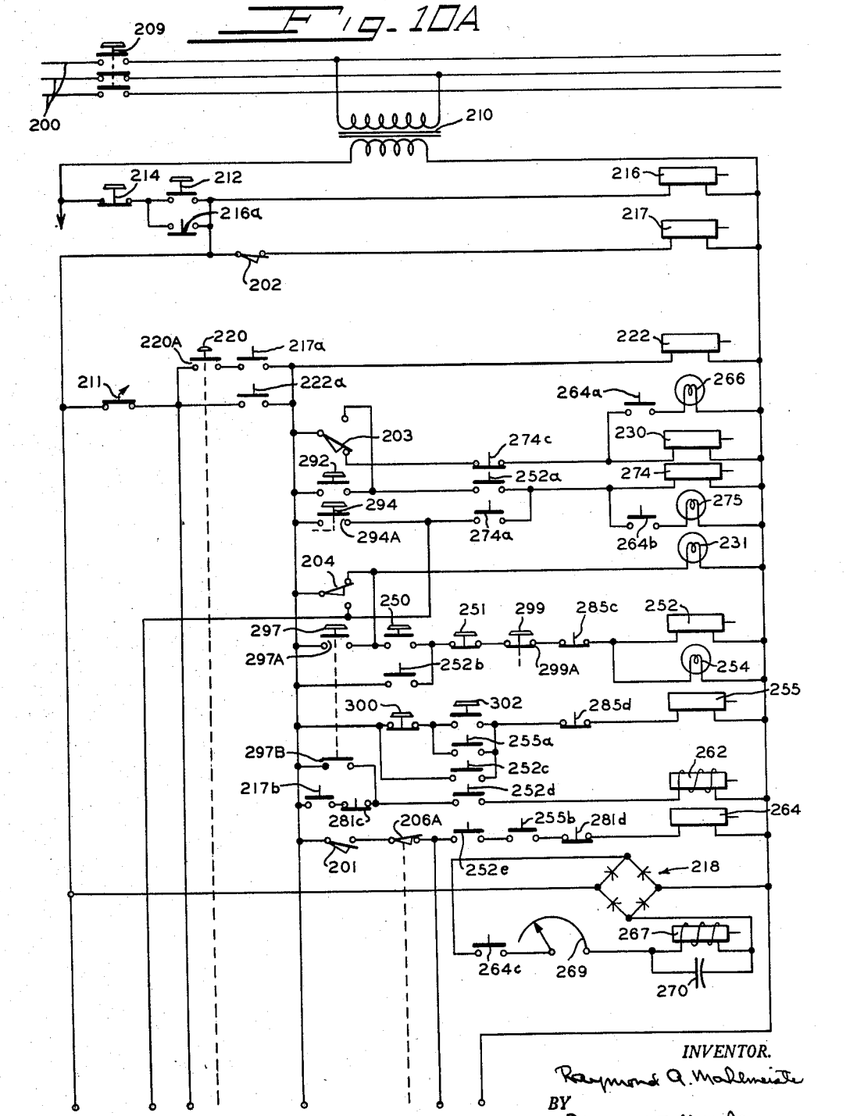
Figures 10B, 10C:
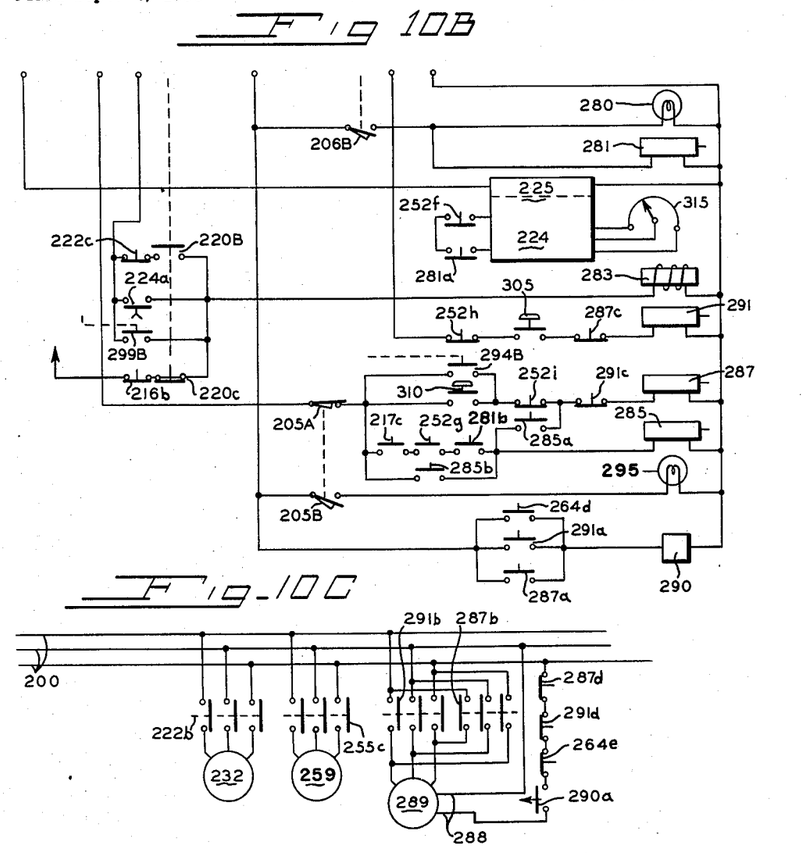

Figures 10 A—C are sections of a common electric control circuit for the machine. In view of the preceding discussion of the mechanical components, limit switches and hydraulic system it is thought that a discussion of this electric circuit is now in order. In general in the following discussion, relay controlled contacts are designated with the relay numerals and small letter additions. Current is supplied through main line leads 200 and main control switch 209 to transformers 125 (Figure 12), 210 and motors 232, 259 and 290. The speed or rate of feed control circuit of Figure 12 is associated with leads 200 through transformer 125. Portions of the electrical circuit relating to control of coolant flow, slow wheelhead motor 34, lubrication, automatic crushing system, coolant refrigeration and the like have been omitted for simplicity.

Figure 11:
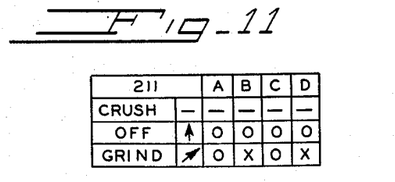
Figure 11 is a diagram of particular switch conditions in the electrical circuit.

After a part is mounted in position and with switch 211 on "grinding" position (Figure 11), Master Start button 212 is depressed. Switch 214 is a Master Stop. This energizes relay 216 closing contacts 216a and opening contacts 216b. When contacts 216a are closed, traverse retracted relay 217 is energized. Clutch coil rectifier 218 is energized and power supply 225 for the grind dwell timer 224 is also energized. Energization of relay 217 closes contacts 217a–c.

Wheelhead Start button 220 is then pressed to momentarily close contacts 220A, B and open contacts 220C. Relay 222 energizes, closing contacts 222a, b, d and opening contacts 222c. When contacts 222a close, fast to slow feed relay 230 is energized through limit switch 203. Light 231 comes on through the closed contacts of limit switch 204 indicating that cam 37 is at its normal reset position. Closing of contacts 222b starts fast wheelhead motor 232. Speed control unit 124 and feed motor 260 are energized when contacts 222d close.

When relay 230 is energized, contacts 230a in Figure 12 are actuated to place the adjusted fast feed potentiometer into the speed controlling circuit and wheelhead feed motor 260 comes up to fast speed.

The operator then presses Cycle Start button 250 to energize Cycle Relay 252, closing contacts 252a–g and opening contacts 252h–i. Switch button 251 is a Cycle Stop control which stops the cycle without retracting the slides or resetting cam 37. Contacts 252b close in a cycle relay holding circuit and cycle light 254 lights indicating that the cycle has commenced. When contacts 252c close, workhead motor relay 255 is energized closing its associated contacts a–c. Contacts 255a close in a holding circuit and closing of contacts 255c starts workhead motor 259. Contacts 255b must be closed (workhead motor 259 running) before feed takes place.

Closing of contacts 252d upon energization of cycle relay 252 energizes traverse forward solenoid 262, shifting valve 265 and moving wheelhead 12 forward a predetermined distance in rapid traverse to position grinding wheel 20 adjacent the work. Traverse retracted limit switch 202 opens and relay 217 is de-energized. Cam normal reset switch 204 is released and shifts. Normal reset light 231 goes out.

When subslide 30 and main slide 28 move simultaneously through forward rapid traverse, limit switch 201 is actuated and closed, energizing wheelhead feed clutch relay 264 to close contacts 264a—d and open contacts 264e. Fast feed light 266 comes on. Wheelhead feed clutch solenoid 267 is energized to engage feed clutch 76 and start feed cam 37 into rotation moving main slide 28 forward relative to subslide 30. Potentiometer 269 serves to control the force of engagement of clutch 76. Capacitance 270 insures quick de-energization of the feed clutch.

Reset motor brake timer 290 is energized through contacts 264d to prepare for a later brake impulse but has no effect at this point in the cycle because contacts 264e are open in the circuit to leads 288 for the brake windings of reset motor 289.

At this point in the cycle wheelhead 12 is moving forward at fast feed and grinding is taking place when switch 203 is actuated by cam rise 100 in carrier box 84. Fast-slow relay 230 is de-energized shifting contacts 230a in speed control unit 124 to slow feed condition. Feed motor 260 slows and fast feed light 266 goes out. Slow feed relay 274 is energized, closing contacts 274d and opening contacts 274c. Slow feed light 275 comes on indicating that this feeding condition is in progress. Contacts 274a close in a holding or sealing circuit. Thus a slow feed condition is maintained until cam 37 is returned to the reset point. If the wheelhead is rapidly retracted, interrupting the cycle, the feed rate will not change.

When grinding wheel 20 reaches its full grinding depth and cam 37 has rotated to bring Cam-Hi portion 58 into association with roller 38, limit switch 206 is actuated, contacts 206A open and 206B close. Feed clutch relay 264 is de-energized to disengage clutch 76. Solenoid or clutch coil 267 is de-energized and slow feed light 275 goes out.

When contacts 206B close, Cam-Hi light 280 goes on and Cam-Hi relay 281 is energized to close contacts 281a, b and open contacts 281c, d. Grind dwell timer 224 is energized, traverse forward solenoid 262 is de-energized and contacts open in the circuit to feed clutch relay 264. Contacts 281b close and set up the circuit to cam reset relay 285, establishing that Cam-Hi position has been reached.

At the completion of the adjusted dwell time timer 224 closes contacts 224a to energize traverse retract solenoid 283 and retract wheelhead 12 in rapid traverse. Limit switches 201 and 203 are released.

Potentiometer 315 controls the dwell time for "spark out" to true up and properly finish the workpiece. For example, an elongated workpiece may be minutely bowed by the force of the infeed movement of wheel 20. The dwell time allows the work to straighten and precise dimensions are obtained.

When the rapid return traverse is completed, switch 202 is closed and relay 217 is energized. Cam reset relay 285 is energized to close contacts 285a, b and open contacts 285c, d. This results in energization of reset motor starter relay or coil 287 to close contacts 287a, b and open contacts 287c, d. Reset motor 289 starts to drive in the reverse direction. Opening of contacts 287c to reset motor forward relay 291 results in opening of contacts 291a, b and closing of contacts 291c, d. Cycle relay 252 and grind dwell timer 224 are de-energized and light 254 goes out. Workhead motor starter relay 255 is de-energized and motor 259 stops. Contacts 287a close to timer 290 which closes contacts 290a with no effect because contacts 287d are open.

Reset motor 289 then drives cam 37 toward the normal reset starting point and Cam-Hi switch 206 is released, extinguishing light 280. When the feed cam reaches its reset point, determined by adjustment 92, limit switch 204 is actuated, reset relay 287 de-energized and reset motor 289 is de-energized. Light 231 comes on to indicate that the reset point has been reached. Slow feed relay 274 is de-energized and fast-slow feed relay 230 energized to shift contacts 230a to fast speed condition.

When cam 37 is at its reset point, the circuit to timer 290 for reset motor brake leads 288 is open. Contacts 290a remain closed, energizing brake leads 288 and after a predetermined delay for stopping, contacts 290a open and the brake is released. Braking provides a clean, accurate stop and the momentary, timed application protects the brake windings connected to leads 288. At this point the automatic grinding cycle is completed.

Slow feed push button 292 is momentarily depressed to change the feed from fast to slow during the automatic cycle and before limit switch 203 has been actuated and slow feed is maintained. When Cam-Lo push button 294 is depressed, contacts 294A, B close and through relay or motor starter coil 287 the feed cam is driven to full Cam-Lo position so that portion 57 is in association with roller follower 38. In the Cam-Lo position limit switch 205 is actuated to control contacts 205A, B and Cam-Lo light 295 comes on. Contacts 294A by-pass reset limit switch 204. Push button 294 must be kept depressed for reset motor 289 to run and when released the brake windings are energized. This provides an incremental jog control toward Cam-Lo.

By-Pass button 297 provides control for completing the cycle if it has been interrupted. If cam normal reset light 231 is not illuminated when starting the grinding cycle or when resuming an interrupted cycle, push button 297 must be momentarily depressed at the same time as Cycle Start button 250 to resume the cycle. Traverse Retract button 299 controls contacts 299A, B and when pressed, the cycle stops and the wheelhead is retracted without resetting cam 37. Workhead Stop button 300 and Start button 302 provide manual control for motor 259.

If the cycle is stopped by depressing Cycle Stop button 251 wheelhead and workhead motors 232, 259 continue running. Traverse Retract button 299 can then be used to retract wheel 20 the rapid traverse amount. If then Cycle Start 250 and By-Pass 297 are simultaneously depressed, the wheel will move forward in rapid traverse to the previous point in the cycle and the cycle resumed. Depressing Traverse Retract button 299 during the cycle stops the cycle and retracts the head and the cycle can be similarly resumed by depressing buttons 250 and 297.

Cam-Hi control push button 305 energizes the reset motor forward relay 291 and reset motor 289 starts rotation toward the Cam-Hi position. Control 305 is effective only when the traverse is forward and limit switch 201 is closed. This provides a forward jog control.

Cam normal reset push button 310 returns wheelhead 12 to its normal reset position. With the wheelhead in this position reset light 231 will be lit if the wheelhead slide is retracted and fast wheelhead motor 232 is running. If the slide is not retracted, the cam will be reset to Cam-Lo position. Control 310 is effective only between the Cam-Hi and cam normal reset positions.

Thus, it is seen that a machine has been provided with a unique control cycle for high precision work, high production and universal application. The structure described can be used with automatic crushing equipment for automatically trueing the grinding wheel after, for example, a predetermined number of pieces have been ground. It can also be used with "during process" and "post-process" gaging.

While the form of apparatus herein described constitutes a preferred embodiment of the invention, it is to be understood that the invention is not limited to this precise form of apparatus and that changes may be made therein without departing from the scope of the invention, which is defined in the appended claims.

What is claimed is:

1. A machine tool comprising a base, a work support on said base, a tool carrying head mounted on said base for movement toward and from the work support, actuating means for said tool head comprising fluid pressure operated means for rapid movement of said head on said base in reverse directions, and an electric motor operative for fast and slow feed movements, manually adjustable means for controlling the speed of rotation of said motor for slow feed, independently adjustable means for controlling the speed of rotation of said motor for fast feed, and calibrated manually adjustable means for selectively setting prior to grinding the extent of movement under both fast and slow feed conditions and the point in the feed movement at which the speed of said motor and the rate of feed is changed from that determined by one of said adjustable means to that determined by the other.

2. A machine tool comprising a base, a work support on said base, a tool carrying head mounted on said base for movement toward and from the work support, actuating means for said tool head comprising feed control means automatically providing sequential fast and slow feed conditions, said feed control means including adjustment means for the slow and fast feed, rapid traverse means for rapidly advancing and retracting said tool head, and control means connected to both said feed control means and to said traverse means for automatically discontinuing said feed means and operating said traverse means for rapidly retracting the tool head a predetermined amount at any point in the sequential feed movement and for rapidly returning the tool head to the same point and restoring feeding movement under the one of the adjusted feed conditions in effect at time of retraction.

3. A grinding machine comprising a base, a work support on said base, a wheelhead carried on said base for movement toward and from said work support, said wheelhead including a grinding wheel and drive means thereof, feed means cooperating between said base and said wheelhead for feeding movement of said wheelhead during grinding, said feed means including a variable speed electric drive motor, a first manually adjustable motor speed control, a second manually adjustable motor speed control, and timing means responsive to feed movement of said wheelhead for automatically switching control of said drive motor from the first motor speed control to the second at a predtermined point in the feeding movement, said timing means including cooperating first and second switching components, means mounting the first of said components on said base, an actuating rod carrying the second of said components, a positive stop on said base for limiting movement of said rod in one direction at a predetermined position, and friction means cooperating between said wheelhead and said actuating rod for positioning said rod in accordance with wheelhead movements while allowing relative movement between said rod and wheelhead as movement of said rod is limited by engagement with said positive stop.

4. A grinding machine comprising a base, a work support on said base, a wheelhead on said base including a grinding wheel and drive means therefor, feed means cooperating between said base and wheelhead including a rotatable plate-type cam carried by one and a cooperating follower carried by the other engaging the periphery of said cam, a variable speed electric motor connecting for driving said cam, manually adjustable means for setting the speed of said motor, and adjustable control means responsive to the position of said wheelhead along said base for automatically controlling the extent of feed movement within each of two predetermined consecutive feed conditions of different speeds.

5. A grinding machine comprising a base, a work support on said base, a main slide carried by said base and movable relative thereto toward and from the work support, cooperating supporting ways respectively fixed to said main slide and said base directly supporting said main slide from said base, a wheelhead on said main slide including a grinding wheel and drive means therefor, a subslide carried by said mainslide for movement relative thereto, cooperating supporting ways respectively fixed to said main slide and said subslide directly supporting said subslide from said main slide, whereby said subslide is indirectly carried from said base through said main slide, first feed means between said base and subslide for movement of said subslide and mainslide together and for holding said subslide stationary during movement of said mainslide relative thereto, second feed means between said subslide and main slide for movement of said main slide and wheelhead toward the work relative to the subslide, and control means operatively connected to said first and second feed means for automatic sequential operation thereof in a grinding operation.

6. A grinding machine comprising a base, a work support on said base, a main slide carried by said base and movable relative thereto toward and from the work support, cooperating supporting ways respectively fixed to said main slide and said base directly supporting said main slide from said base, a wheelhead on said main slide including a grinding wheel and drive means therefor, a subslide carried by said main slide for movement relative thereto, cooperating supporting ways respectively fixed to said main slide and said subslide directly supporting said subslide from said main slide, whereby said subslide is indirectly carried from said base through said main slide, first feed means between a first pair of relatively movable components comprising actuating means for rapid movement therebetween through a predetermined displacement in either direction of movement, second feed means between a second pair of relatively movable components comprising drive means therebetween for slow and fast feed movemements, said second feed means including means for adjusting the rate and extent of relative feed movement as desired, and control means operatively connected to first and second feed means for automatic sequential operation thereof in a grinding operation.

7. A grinding machine comprising a base, a work support on said base, a main slide carried on said base and movable relative thereto toward and from the work support, cooperating supporting ways respectively fixed to said main slide and said base directly supporting said main slide from said base, a wheelhead on said main slide including a grinding wheel and drive means therefor, a subslide carried by said main slide for movement relative thereto, cooperating supporting ways respectively fixed to said main slide and said subslide directly supporting said subslide from said main slide, whereby said subslide is indirectly carried from said base through said main slide, first feed means between said base and subslide for movement of said subslide and main slide together and for holding said subslide stationary during movement of said main slide relative thereto, second feed means between said subslide and main slide for movement of said main slide and wheelhead relative to the subslide, one of said feed means comprising a rotatable plate-type cam with a rise on its peripheral surface and follower means engaging said peripheral surface cooperating between the respective relatively movable components, a drive motor for rotating said cam, and control means operatively connected to said first and second feed means for automatic sequential operation thereof in a grinding operation including means for controlling the speed of said motor and the extent of its rotation during grinding.

8. A grinding machine as set forth in claim 7 wherein said drive motor is electrically driven and wherein the other of said feed means includes fluid motor actuating means connected between the second pair of relatively movable components.

9. A grinding machine comprising a base, a work support on said base, a main slide carried on said base for movement toward and from the work support, cooperating supporting ways respectively fixed to said main slide and said base directly supporting said main slide from said base, a subslide carried by said main slide and movable relative thereto toward and from the work support, cooperating supporting ways respectively fixed to said main slide and said subslide directly supporting said subslide from said main slide, whereby said subslide is indirectly carried from said base through said main slide, a wheelhead on said main slide including a grinding wheel and drive means therefore, first feed means between said base and subslide including an actuating cylinder and connecting rod therebetween operative for a predetermined rapid displacement of said subslide and wheelhead in selective reverse directions and for holding said subslide stationary during movement of said main slide relative thereto, second feed means between said subslide and main slide including a rotatable plate-type cam carried by said subslide and cooperating follower means engaging the periphery of said cam carried by the main slide, an electric drive motor connected to rotate said cam for movement of said main slide and wheelhead relative to the subslide, and control means operavtively connected to said cylinder and drive motor for automatic sequential operation thereof in a grinding operation.

10. A grinding machine as set forth in claim 9 wherein said control means includes means for adjustably setting the speed of said drive motor in each of two sequential feed ranges.

11. A grinding machine comprising a base, a work support on said base, a wheelhead carried on said base for movement toward and from said work support, said wheelhead including a grinding wheel and drive means thereof, feed means cooperating between said base and said wheelhead for feeding movement of said wheelhead during grinding, said feed means including feed drive means, and timing means responsive to feed movement of said wheelhead for automatically controlling said feed drive means for a predetermined sequential feeding cycle, said timing means including cooperating first and second switching components, means mounting the first of said components on said base, an actuating member carrying the second of said components, a positive stop on said base for limiting movement of said member in one direction at a predetermined position, and friction means cooperating between said wheelhead and said actuating member for positioning said member in accordance with wheelhead movements while allowing relative movement between said member and wheelhead as movement of said member is limited by engagement with said positive stop.

12. A grinding machine comprising a base, a work support on said base, a wheelhead carried on said base for movement toward and from said work support, said wheelhead including a grinding wheel and drive means thereof, feed means cooperating between said base and said wheelhead for feeding movement of said wheelhead during grinding, said feed means including variable speed drive means, a first manually adjustable speed control for said drive means, a second manually adjustable speed control for said drive means, and timing means responsive to feed movement of said wheelhead for automatically switching control of said drive means from the first speed control to the second at a predetermined point in the feeding movement, said timing means including cooperating first and second switching components, means mounting the first of said components on said base, an actuating member carrying the second of said components, a positive stop on said base for limiting movement of said member in one direction at a predetermined position, and friction means cooperating between said wheelhead and said actuating member for positioning said member in accordance with wheelhead movements while allowing relative movement between said member and wheelhead as movement of said member is limited by engagement with said positive stop.

13. A grinding machine comprising a base, a work support on said base, a wheelhead carried on said base for movement toward and from said work support, said wheelhead including a grinding wheel and drive means thereof, feed means cooperating bewteen said base and said wheelhead for feeding movement of said wheelhead during grinding, said feed means including a variable speed electric drive motor, a first manually adjustable motor speed control, a second manually adjustable motor speed control, timing means responsive to feed movement of said wheelhead for automatically switching control of said drive motor from the first motor speed control to the second at a predetermined point in the sequential grinding feed movement, a fluid pressure actuating unit cooperating between said base and said wheelhead for rapid transverse operation to advance and retract said wheelhead relative to the work support, and control means connected to both said feed means and to said actuating unit for automatically discontinuing said feed means and energizing said pressure actuating unit for rapidly retracting said wheelhead a predetermined amount at any point in the sequential feed movement and for rapidly returning the wheelhead to the same point and restoring the sequential feed movement under the one of the adjusted feed conditions in effect at time of reaction, said timing means including cooperating first and second switching components, means mounting the first of said components on said base, an actuating rod carrying the second of said components, a positive stop on said base for limiting movement of said rod in one direction at a predetermined position, and friction means cooperating between said wheelhead and said actuating rod for positioning said rod in accordance with wheelhead movements while allowing relative movement beween said rod and wheelhead as movement of said rod is limited by engagement with said positive stop.

14. A grinding machine comprising a base, a work support on said base, a wheelhead carried on said base for movement toward and from said work support, said wheelhead including a grinding wheel and drive means thereof, feed means coperating between said base and said wheelhead for feeding movement of said wheelhead during grinding, said feed means including a variable speed electric drive motor, a rotatable plate type cam and follower means cooperating between the base and wheelhead, means connecting said cam to said drive motor, a reset motor for rotating said cam in a reverse direction following grinding, a first manually adjustable drive motor speed control, a second manually adjustable drive motor speed control, timing means responsive to feed movement of said wheelhead for automatically switching control of said drive motor from the first motor speed control to the second at a predetermined point in the feeding movement, and means for automatically disconnecting said drive motor and energizing said reset motor to rotate said cam for reset movement following grinding.

References Cited in the file of this patent

UNITED STATES PATENTS

| Re. 23,991 | Balsiger et al. | May 3, 1955 |
| 2,150,749 | Price et al. | Mar. 14, 1939 |
| 2,175,057 | Kearns | Oct. 3, 1939 |
| 2,349,786 | Flygare et al. | May 23, 1944 |
| 2,582,610 | Swainey | Jan. 15, 1952 |